METHOD OF MAKING A RECORDING ASSEMBLY

Original Filed Oct. 21, 1963 Sheet 1 of 2

INVENTOR.
LEO W. PAGE
BY Price & Heneveld
ATTORNEYS

INVENTOR.
LEO W. PAGE
BY Price & Heneveld
ATTORNEYS 3,432,921
Patented Mar. 18, 1969

3,432,921

METHOD OF MAKING A RECORDING ASSEMBLY

Leo W. Page, Potterville, Mich., assignor, by mesne assignments, to USI Corporation, Pasadena, Calif., a corporation of Illinois Application Oct. 21, 1963, Ser. No. 317,461, now abandoned, which is a continuation-in-part of application Ser. No. 262,525, Mar. 4, 1963. Divided and this application July 27, 1967, Ser. No. 674,026
U.S. Cl. 29—603 3 Claims
Int. Cl. H01f 7/06; G11b 5/00

ABSTRACT OF THE DISCLOSURE

A method of making a recording assembly having a plurality of heads or transducers therein with a slit in the housing to prevent cross-talk between these heads or transducers comprising the steps of providing slits on the inner surfaces of opposite walls of the housing and embossment of the outer walls of the housing coincident with the slits. The slits extend into the embossments. After the transducer heads are assembled within the housing the embossments are removed by machine exposing the open slits in the walls.

This application is a divisional application of the parent application entitled Recording Assembly and Method of Making the Same, filed Oct. 21, 1963, Ser. No. 317,461 by Leo W. Page, now abandoned, which is in turn a continuation-in-part application of patent application Ser. No. 262,525 filed Mar. 4, 1963, entitled Combination Record and Erase Head, and assigned to the assignee herein.

This invention relates to magnetic tape recorder heads, particularly multi-heads having a metallic housing, and also relates to a method of making magnetic tape recorder head assemblies.

In magnetic tape recorder head assemblies having multi-recording heads mounted side by side to provide multi-channel recording apparatus one problem experienced is cross-talk between the respective heads. Such cross-talk is created by the electrical field from the coil of one head inducing a magnetic flux in the core of another head.

Early efforts to reduce this cross-talk to a tolerable value involved the employment of a central shield plate between the heads, especially between the coils of the heads. The purpose is to create as large a recording decibel differential between them as possible. Further, the components of the two heads were encased in a non-conductive, non-magnetic housing, conventionally of a plastic material.

Shields between the heads, however, have not solved the entire problem. In some instances, for example, such as disclosed in my co-pending application Ser. No. 262,525, when a highly conductive member surrounds the head for shielding purposes or otherwise, the electrical field of one coil causes a current to flow about the heads. This current in turn induces a flux in the other core to cause cross-talk. In effect, such surrounding conductive member acts like a one turn transformer to create the cross-talk.

In some applications of recording heads, metallic housings are preferred by the manufacturers of recording equipment. This is because of the smaller oxide pick up off the tape, and for other various reasons. The metal housing creates a very serious cross-talk problem like any other surrounding highly conductive member. Electrical currents from one coil flow readily around the housing enclosing both of the recording heads, to create a current action similar to a single transformer turn. This current flow induces a magnetic flux in the second core of the second head adjacent the one recording, to create undesirable cross-talk. Hence, undesired audio signals, cross-talk, records on the second track of the tape. Generally, a metallic housing lowers the decibel differential to such a small value that the result in audio disturbance materially decreases quality of recording.

In accordance with this invention I have developed a novel construction for a recording head assembly, enabling the use of a metallic housing, but without a resulting serious cross-talk problem. This novel construction stops stray current flow by utilizing principles of short circuitry and open circuitry in a unique manner. The integral structure itself decreases the flow of current around the surrounnding housing means to an insignificant value.

The chief object of this invention is to provide a magnetic tape recorder head assembly having at least a double head and a metallic housing, and yet an insignificant amount of cross-talk.

Another object of this invention is to provide a recorder head assembly with a metallic housing of simple, inexpensive slotted wall construction, substantially free of electrical current flow causing cross-talk interference.

Another object of this invention is to provide a double-head, magnetic tape recorder assembly having a slotted metallic housing capable of preventing continuous current flow around the housing, and also of optimum strength even though slotted.

Still another object of this invention is to provide a novel method of fabricating a magnetic recorder head assembly having current short circuit means.

These and several other objects of this invention will become apparent upon studying the following specification in conjunction with the drawings in which.

Figures 1, 2, 3:
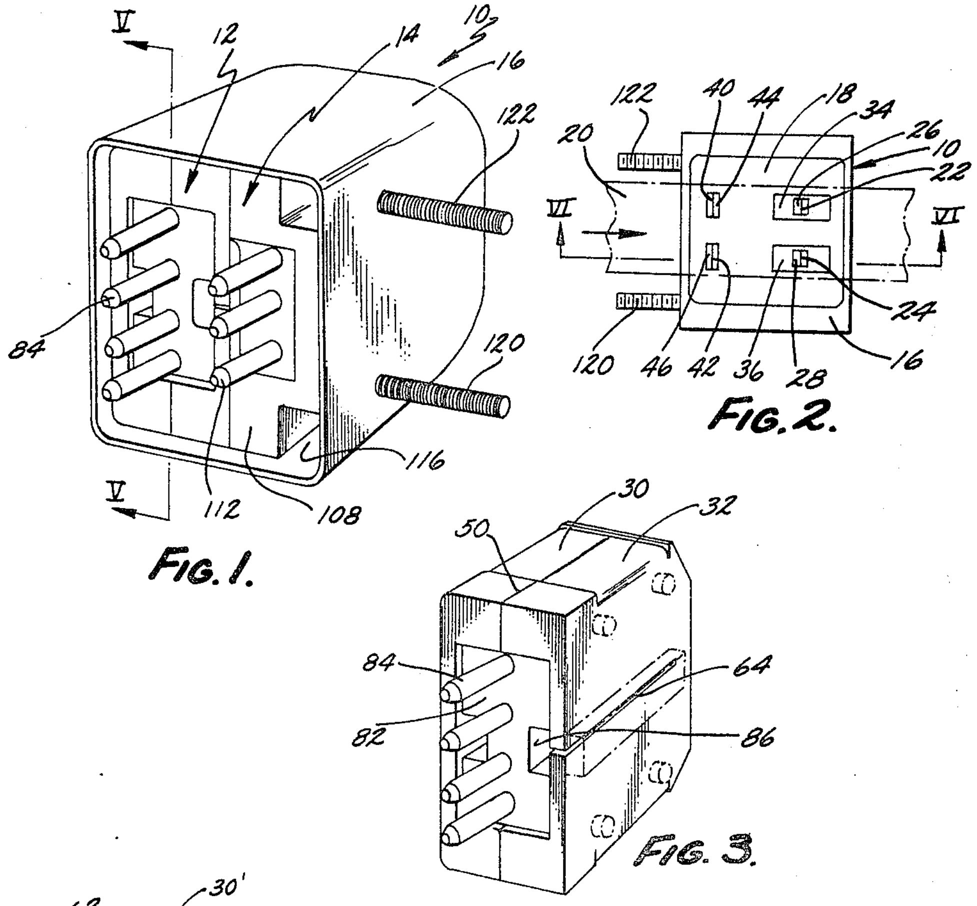
FIG. 1 is a perspective view of a complete double recorder-head, double-head assembly employing the novel invention.
FIG. 2 is an elevational view of the recording and erasing surface of the head.
FIG. 3 is a perspective view of the double recording head assembly forming a portion of the apparatus in FIGS. 1 and 2.

Referring now specifically to the drawings, the complete recording and erasing unit 10 comprises a double headed recorder assembly 12, and a double headed eraser assembly 14. These are enclosed in a housing shell 16. This housing shell is of a thin material such as a metallic substance of low reluctance. It includes four, peripheral, integral walls, one open end, and a flattened tape recorder end surface 18 over which the magnetic tape 20 (shown in phantom) moves as indicated by the arrow in FIG. 2.

In the usual form of the recording head assembly, tiny accurately controlled gaps are formed at 22 and 24 between the ground off protruding ends of the two core means 26 and 28. Around these two core portions are surrounding segments of the housings (FIG. 3) at 34 and 36.

In alignment with these two recording heads is a pair of eraser heads. These include eraser gaps 40 and 42 formed between their respective core segments 44 and 46 extending out respective openings formed in the end of housing shell 16.

This invention is particularly related to the portion of the apparatus illustrated in FIG. 3, i.e. the double recording head and its enclosure housing assembly. The two halves 30 and 32 of the housing for the recorder heads is of a metal such as zinc. Thsee are substantially identical to each other. The two halves, secured together along a parting plane 50, form an elongated housing. The housing is formed by the four walls, with each half forming one elongated wall and two halves of two shorted walls.

Figure 4:
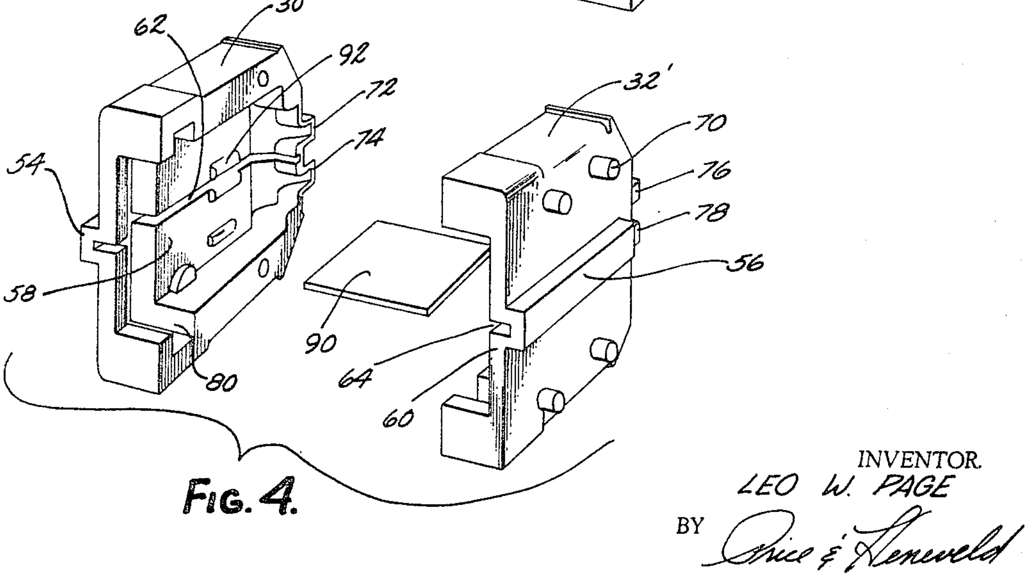
FIG. 4 is a perspective exploded view of the two halves of the housing around the double recorder-head, and a shield plate, before assembly.

The housing half shell components are initially configurated as illustrated in FIG. 4 at 30' and 32' before assembly of the apparatus. That is, they include elongated outer embossments 54 and 56, extending a substantial distance along the unit from end to end. Formed within the housing halves, and more specifically in the central portion of the inner-wall surfaces 58 and 60 from end to end, and coincident with these embossments, is a pair of elongated slits or slots 62 and 64. The depth of these slots is greater than the thickness of the wall itself at these portions, and partially within the embossments. When the embossments are removed, the slots extend through the walls as illustrated in FIG. 3.

Each outer wall of each half of the housing also has four small protrusions 70. These are merely to facilitate high production manufacturing and assembly by enabling the elements to be stacked one upon the other without tipping.

The upper ends of the housing halves include pair of conventional hollow protrusions 72, 74, 76 and 78. These receive the protruding core ends that form the gap for the recorder heads (in phantom in FIG. 6). All of these protrusions are ultimately ground or otherwise machined off and housing assembly as illustrated in FIG. 3.

The lower portion of the housing includes recess means 80 to receive an electrical, insulating, terminal plate 82 from which terminals 84 project. Four terminals are provided for the two recording heads. The terminal plate includes a pair of openings 86 to enable the potting compound to be injected in a manner to be described hereinafter.

Figure 5:
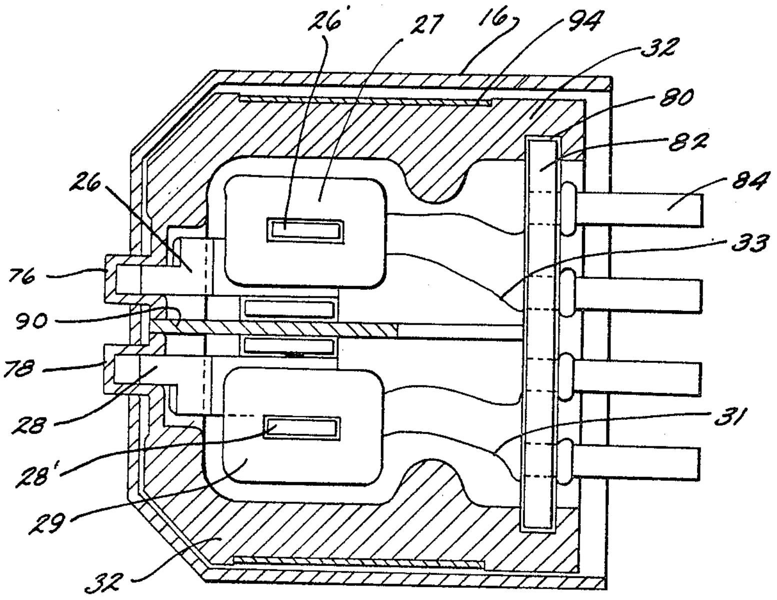
FIG. 5 is a sectional view of the device in FIG. 1 taken on plane V—V.
Figure 6:
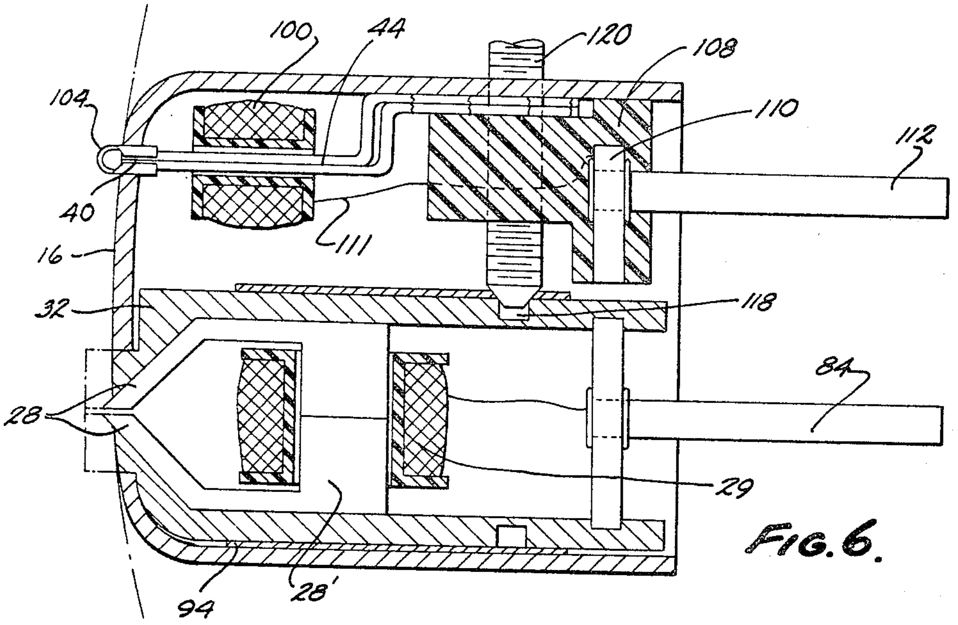
FIG. 6 is a sectional view of the apparatus in FIGS. 1 and 2 taken on plane VI—VI.

The internal assembly of the unit may be seen from FIGS. 5 and 6. Each of the recording heads embodied in shell 16 includes a core and coil means. Core 26 has a portion 26' extending within coil 27. Core 28 has a portion 28' extending within coil 29. Lead wires 31 extend from coil 29 to its terminals (FIG. 5), and lead wires 33 extend from coil 27 to its terminals.

Positioned centrally of the housing, transversely between the two coils 27 and 29, and over a substantial portion of the length of the housing, is a highly conductive metallic shield plate 90. During assembly this shield plate is guided into position by alignment embossments 92 within the housing. Its end portions are embedded into portions of slots 62 and 64. The entire combination of components, including the shield plate, operates uniquely, as will be described.

Around the housing is a highly conductive metallic shield jacket 94 of the type described in the above parent application.

Adjacent the two recording heads are the two eraser heads. Each includes a coil 100 around a core 44. The core includes a cap portion 104 protruding out an opening in the top of housing shell 16 to be ground for exposure of erasing gap 40. The eraser cores 44 and 46 are secured in place by a plastic insert 108. This insert reserves terminal plate 110 for the three terminals 112 of the eraser head. A lead wire 111 connects coil 100 with terminal 112. This plastic insert includes openings 116 (FIG. 1) for insertion of potting material into the housing 12.

Extending through the wall of the housing, through cores 44 and 46, through plastic insert 108, and into abutment with the indentation 118 in housing portion 32 is a pair of threaded studs 120 and 122. These serve as mounting means for the entire unit. They also serve to help locate and affix the housing of the recorder heads in the shell.

Figure 7:
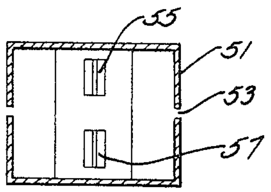
FIG. 7 is a top view of one of the first forms of the invention developed, showing the record heads assembly.

In FIG. 7 is illustrated one of the earlier forms of this invention. A highly conductive metallic shield 51 surrounds the recorder head assembly. The shield has a split nature, with oppositely positioned slits 53 on a plane between the recording heads, and transversely of the housing across its central portion. Thus the electrical current which would otherwise flow completely around the surrounding conductive shield means from the electrical field of one or both coils of the heads 55 and 57, is stopped by the non-conductive barrier gaps, to reduce cross-talk effects.

*Method of manufacture*

To fabricate the novel construction in a unique manner, the two housing half shells are formed as by die casting. These are preformed to include the novel elongated embossments 54 and 56, as well as embossments 72, 74, 76, 78 and 70.

The operative components are inserted into these housing halves for the two recording heads. These include coils 27 and 29, and cores 26 and 28. The leads connect these coils with terminals 84. The terminals 84, mounted in terminal plate 82 are located when the two housing half shells are placed together to anchor the plate in recess 80. Also, the shield plate centrally of the housing 90 is inserted into the upper halves of the slots 62 and 64 to make electrical contact with the housing walls and also obtain securement between the walls. This provides a complete electrical shield between the two coils of the recording heads.

With the two halves of the housings held securely together, the embossments are removed, as by grinding. These embossments enable the housing half shells to be adapted to high speed production and assembly operations without fear of breaking the housing components during assembly. They are sturdy and reliable since the embossments are only ground off after the assembly is secured together. Internal components are also preferably potted before removal of the embossments by injection of an uncured resin into opening 86 and curing it. This secures the elements together in fixed relationship.

The double recording head, with the elongated embossments 54 and 56 and pips 70 removed, is then inserted into housing shell 16. Next, the double eraser heads are inserted into the opposite end of the housing. Studs 120 and 122 are threaded through them into engagement with the housing for the recorder heads. Next a potting compound is injected into the space around the eraser heads through openings 16, to secure the entire apparatus into an integral rigid construction.

In operation, electrical fields are created around the two coils 27 and 29 of the recorder heads. Since a metallic housing formed of the two half shells 30 and 32 surrounds these coils, the current would normally tend to flow around the assembled housing. Without the novel construction the electrical current would flow from one end of the housing to the other end to cause an induced magnetic current in the second core. However, the novel slits in the housing cause an open circuit. Current cannot readily flow around the complete housing. The effect of this in preventing cross-talk signals is supplemented by shielding plate 90 secured in the upper ends of the slots. Any electrical current which does tend to flow is short circuited through this highly conductive shielding plate. Therefore, it never flows from one end of the housing to the other, and from one coil of one head to the core of the other head.

It has been found during actual operation that this construction is extremely effective as well as inexpensive. It increases the decibel differential between the recording heads into the 30 to 50 decibel range, for top quality performance. Yet, this result is achieved very readily by these simple but extremely effective and unique manufacturing techniques.

Various additional advantages and objects of this invention will be apparent to those in the art upon studying this specification. Also, it is conceivable that certain minor structural modifications could be made without departing from the concepts and the principles taught. Therefore, this invention is not to be limited merely to the specific form shown, but only by the scope of the appended claims and those structures reasonably equivalent to those defined therein.

I claim:

1. A method of fabricating a magnetic tape recording head with a metallic housing comprising the steps of: forming a peripheral metal housing comprising two opposed parts each having a lower edge and a top; each part having a central, elongated embossment on the outer surface of one of its walls; said embossment extending from said lower edge a major distance upwardly toward said top; forming slits in the inner surfaces of said wall coincident with said embossments said slits being of sufficient depth to extend into said embossment; inserting and securing a pair of heads, including cores and coils, between said parts and securing said parts together with the said walls of said parts opposite each other; said heads being in opposite ends of said housing formed by said parts and on opposite sides of a plane passing through said embossments; and machining off said embossments at least to the depth of said slits, leaving said slits extending through said opposite walls.

2. A method of fabricating a magnetic tape recording head having a housing of conductive material, said housing having a lower edge and a top, comprising the steps of: forming a housing having internal centrally located slits in the inner wall surfaces of two opposite walls, said slits extending from said lower edge a major distance upwardly toward said top and having externally protruding elongated centrally located embossments on the outer wall surfaces of said two walls coincident with said slits; inserting and securing a pair of heads inside said housing, including cores and coils, with said heads being on opposite sides of said central embossments; and removing said embossments to expose said slits and provide electrical current barrier for current flow around the complete housing.

3. A method of fabricating a magnetic tape recording head having a housing of conductive material, said housing having a lower edge and a top, comprising the steps of: forming a housing having internal centrally located slits in the inner wall surfaces of two opposite walls, said slits extending from said lower edge a major distance upwardly toward said top and having externally protruding elongated centrally located embossments on the outer wall surfaces of said two walls coincident with said slits; inserting an electrically conductive shield plate in said housing with its ends in said slits; inserting and securing a pair of heads inside said housing, including cores and coils, with said heads being on opposite sides of said central embossments and said plate; and removing said embossments to expose said slits and provide electrical current barriers for current flow around the complete housing.

References Cited

UNITED STATES PATENTS

| | | | |
|---|---|---|---|
| 3,034,109 | 5/1962 | Maclay | 340—174.1 |
| 3,037,089 | 5/1962 | Warren | 179—100.2 |
| 3,211,843 | 10/1965 | Dundovic et al. | 179—100.2 |

JOHN F. CAMPBELL, *Primary Examiner.*

C. E. HALL, *Assistant Examiner.*

U.S. Cl. X.R.

179—100.2

PO-1050
(5/69)

UNITED STATES PATENT OFFICE
CERTIFICATE OF CORRECTION

Patent No. 3,432,921 Dated March 18, 1969

Inventor(s) Leo W. Page

It is certified that error appears in the above-identified patent and that said Letters Patent are hereby corrected as shown below:

The assignor should read --- VSI Corporation ---.

Column 3, line 35;

"off and housing" should read --- off the housing ---;

Column 6, line 6;

"barrier" should read --- barriers ---.

SIGNED AND
SEALED
FEB 24 1970

(SEAL)
Attest:

Edward M. Fletcher, Jr.
Attesting Officer

WILLIAM E. SCHUYLER, JR.
Commissioner of Patents